F. X. WIEDEMAN.
CLAMPING DEVICE.
APPLICATION FILED AUG. 4, 1911.
1,118,716.
Patented Nov. 24, 1914.
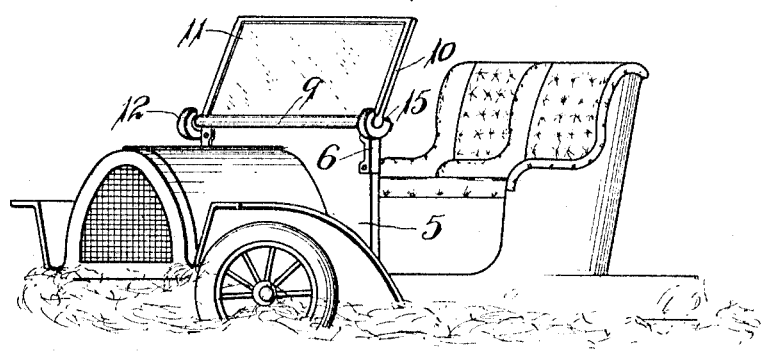
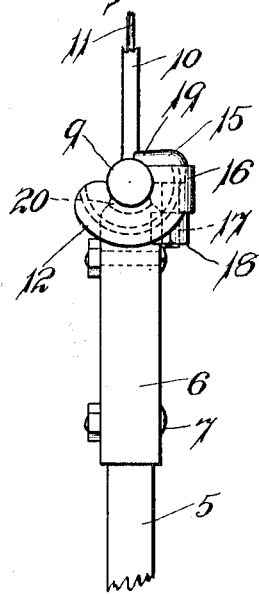
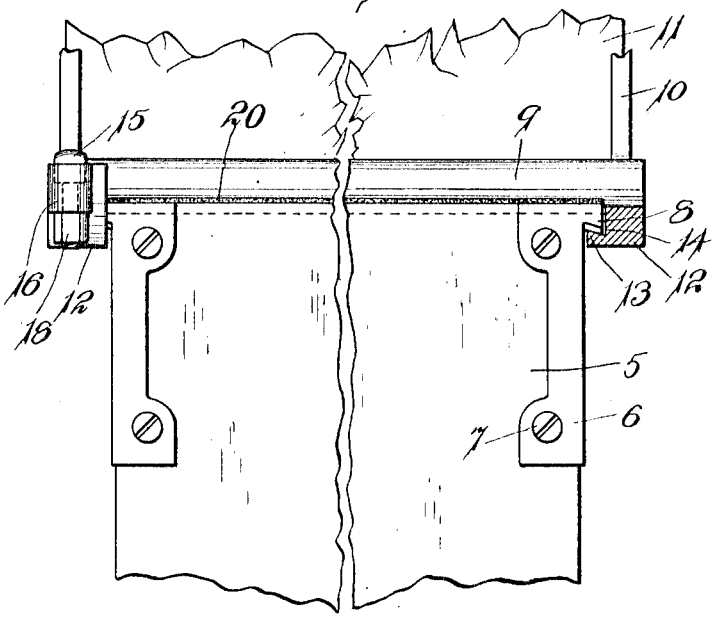
WITNESSES:
Louis Lucia
E. L. Stoughton
INVENTOR.
Frank X. Wiedeman
BY
Arthur B. Jenkins
ATTORNEY.

UNITED STATES PATENT OFFICE.

FRANK X. WIEDEMAN, OF HARTFORD, CONNECTICUT.

CLAMPING DEVICE.

1,118,716. Specification of Letters Patent. Patented Nov. 24, 1914.

Application filed August 4, 1911. Serial No. 642,349.

*To all whom it may concern:*

Be it known that I, FRANK X. WIEDEMAN, a subject of the Emperor of Germany, and a resident of Hartford, in the county of Hartford and State of Connecticut, have invented a new and Improved Clamping Device, of which the following is a specification.

My invention relates generally to the class of devices used to adjustably clamp a part in place and is more especially adapted to clamp rotatably adjustable parts, and an object of my invention, among others, is to provide a device of this class simple in construction, effective in operation, and one which may be easily and conveniently placed in any position desired and without liability to rattle.

One form of device embodying my invention and in the construction and use of which the objects above named, as well as others, may be attained is illustrated in the accompanying drawings, in which—

Figure 1 is a perspective view of a portion of a vehicle showing my improved clamp applied to the wind shield thereof. Fig. 2 is a detail view of a portion of the dash board of a vehicle showing my improved clamp as applied to the wind shield thereon, parts being broken away to show construction, and the center of the device also being broken out. Fig. 3 is an end view of the same.

My improved clamp is especially useful in connection with the wind shields of vehicles and I have therefore selected such a device for the purpose of disclosure of my invention herein.

In the accompanying drawings the numeral 5 indicates the dash board of a vehicle to each end of which a bracket 6 is secured, this bracket being preferably formed of a single piece of metal overlapping the ends and sides of the dash board and secured in place in any convenient manner, as by means of screws 7. The upper edge of each bracket has a lip 8 extending from that side of the bracket resting against the end of the dash board, and this lip is curved on the arc of a circle both as to its upper and under surfaces, the upper curved surface forming a recessed set or socket for the reception of a rod 9. This lip is shown in the drawings herein as being of dove-tailed shape, this being illustrated more particularly in Fig. 2 of the drawings, but I do not contemplate such dove-tailed shape as being absolutely essential to the invention.

The rod 9 has side pieces 10 properly shaped and formed to contain a glass 11 of the wind shield proper. These side pieces may be of any desired construction and form to receive and hold said glass.

Holders 12 are formed with lips 13 projecting from the inner sides and forming a space or groove 14, when the bar 9 is in position, to receive the lip 8, as plainly shown in Fig. 2 of the drawings. The bar 9 is rigidly secured to each of the holders, one holder being located at each end of the bar. In the preferred form of construction, and as shown herein a clip 15 projects through an ear 16 on each of the holders, the shank 17 of this clip being threaded to receive a nut 18, by means of which the head 19 of the clip is drawn down to clamp the bar 9 firmly between the body of the holder and the head 19.

A piece 20 of felt or other yielding material is placed upon the edge of the dash board 5 extending preferably substantially the whole length of said upper edge, and the bar 9 rests upon this strip.

It will be noted that the holders 12 are rigidly secured to the bar 9 in engagement with the lips 8 of the bracket 6, and that by means of the yielding strip 20 the lips 8 and 13 are caused to bind each other with sufficient friction so that while permitting movement of the wind shield to any position which may be desired yet at the same time they will hold said shield securely in such position and without any additional clamping means, it being necessary merely to move the shield to the position desired when it will be found to remain in such position. The construction also avoids any rattling of the parts.

While I have shown and described herein a preferred form of construction of my improved device it will be understood that this may be changed to a greater or lesser extent without departing from the spirit and intent of the invention, and I do not therefore limit myself to the precise form of construction herein shown and described.

While the device is described in connection with, and the claims are drawn to a wind shield, it will be obvious that the clamps may be used for supporting devices other than wind shields without the exercise of anything more than mechanical skill.

I claim—

1. A clamp including a member formed to receive a clamped device and having a lip forming a shoulder, a holder having a lip to engage said shoulder and a partially formed recess to receive a clamped member, a clamping member having a lip to partially form said recess that is opened on one side, and means for securing the clamping member in place.

2. A clamp including a member shaped to receive a clamped device and having a lip forming a shoulder, a holder having a lip to engage said shoulder, and a partially formed recess to receive said clamped member, a clamping member having a lip to engage said clamped member, and means for securing the clamping member in place.

3. A clamp including a member having a seat for a clamped device and a circularly formed lip forming a shoulder, a holder having a lip to engage said shoulder and a partially formed recess, a clip partially forming said recess that is open on one side, and means for securing the clip in place.

4. A wind shield bracket having a partially formed recess, means for securing the bracket in position, a clamping member having a lip to partially complete the formation of the recess that is open on one side, the edges of said opening being spaced apart to receive and permit swinging movement of a wind shield between the edges of said recess, and means for securing the clamping member in place.

5. A bracket having means to secure it in place and having a partially formed recess and a circularly formed projection about said recess, a clamping member having a shoulder to receive said projection and a lip to partially complete the formation of the recess that is open on one side, and means for securing the clamping member to bind said projection, shoulder and attached member together.

6. A clamping device including a bracket having a recess and a projecting lip, a bar resting in said recess, a holder formed to receive said bar and also having a lip forming with said bar a recess to receive the lip from the bracket, a clip bolt having a head to clamp the bar in the holder against turning movement, and means for securing the clip in position.

7. A wind shield bracket having a partially formed recess on one side to receive a bar of a wind shield, and also having a socket to receive a clamping member, a clamping member having a shank located in said socket and with a lip to partially complete the formation of said recess that is open on one side, the edges of said opening being spaced apart to receive and permit swinging movement of a wind shield between the edges of said recess, and means engaging said shank to secure the clamping member in place.

FRANK X. WIEDEMAN.

Witnesses:
ARTHUR B. JENKINS,
E. L. STOUGHTON.

Copies of this patent may be obtained for five cents each, by addressing the "Commissioner of Patents, Washington, D. C."